(12) United States Patent
Kawakami

(10) Patent No.: US 8,840,325 B1
(45) Date of Patent: Sep. 23, 2014

(54) FOCAL PLANE SHUTTER FOR CAMERA

(71) Applicant: Nidec Copal Corporation, Tokyo (JP)

(72) Inventor: Kenta Kawakami, Saitama (JP)

(73) Assignee: Nidec Copal Corporation, Itabashi-Ku, Tokyo (JP)

( * ) Notice: Subject to any disclaimer, the term of this patent is extended or adjusted under 35 U.S.C. 154(b) by 0 days.

(21) Appl. No.: 14/225,830

(22) Filed: Mar. 26, 2014

(30) Foreign Application Priority Data

Mar. 29, 2013 (JP) .................................. 2013-072957
Dec. 6, 2013 (JP) .................................. 2013-253564

(51) Int. Cl.
*G03B 9/42* (2006.01)
*G03B 9/10* (2006.01)

(52) U.S. Cl.
CPC ........................................ *G03B 9/10* (2013.01)
USPC ...................................................... 396/486

(58) Field of Classification Search
CPC ............... G03B 9/18; G03B 9/40; G03B 9/42
USPC .................................................. 396/486, 493
See application file for complete search history.

(56) References Cited

U.S. PATENT DOCUMENTS 6,726,381 B2 * 4/2004 Takahashi et al. ............ 396/486
2002/0172519 A1 * 11/2002 Takahashi et al. ............ 396/486

FOREIGN PATENT DOCUMENTS

| JP | 2002341400 A | 11/2002 |
| JP | 2003241257 A | 8/2003 |
| JP | 2003270700 A | 9/2003 |
| JP | 2004093875 A | 3/2004 |

* cited by examiner

*Primary Examiner* — W B Perkey
(74) *Attorney, Agent, or Firm* — Davis & Bujold, PLLC; Michael J. Bujold

(57) ABSTRACT

A focal plane shutter for a camera which is suitable for miniaturization and arranged to prevent wear debris from entering into a blade chamber via a base plate hole. Wall portions (1j and 1k) are formed protruding towards the blade chamber side surface from edges of the elongated holes (1b and 1c) provided in a base plate (1). Rear blade-use arms (14 and 15) have step-like bent portions (14b and 15a) formed therein so that a tip end side of the arms is positioned further toward the base plate (1) than the rotation center side. During operation, the bent portions (14b and 15b) allow a small gap to be maintained between the wall portion (1k) and the rear blade-use arms (14 and 15). The freedom in determining the layout is not restricted so that miniaturization of the device is possible and entry of debris into the blade chamber is suppressed.

8 Claims, 8 Drawing Sheets

FOCAL PLANE SHUTTER FOR CAMERA

FIELD OF THE INVENTION

The present invention relates to a focal plane shutter for a camera in which light-shielding blades are constructed from a plurality of arms pivotally attached to a base plate with at least one blade pivotally supported by each arm.

BACKGROUND ART

The light-shielding blades in the focal plane shutter for a camera are constructed from a plurality of arms pivotally attached to a base plate with at least one blade pivotally supported by each arm. When the arms are caused to rotate back and forth within a predetermined angular range, the blades operate between a position at which the focal plane is covered and a position of withdrawal from in front of the focal plane. The light-shielding blade constructed in this way is caused to operate through a linkage to a driving member that is attached to the base plate and rotates back and forth through a predetermined angle. Since the driving member is attached to a surface outside the blade chamber of the base plate, the base plate has a through hole formed therein, and a driving pin provided on the driving member is inserted in the through hole and is coupled to one of the above-described arms in the blade chamber. The through hole is formed as a substantially arc-like elongated hole to accommodate the back and forth motion of the driving pin centered on the rotation axis of the driving member.

Note that, besides the above-described driving member, a variety of other component members are attached to the surface of the base plate outside the blade chamber, and the majority of those are positioned relatively close to the elongated hole. Moreover, these component members are members that move during operation, or members that slide against or contact the moving members. Thus, when the shutter is operated, the sliding, contact etc. in proximity to the elongated hole results in the generation of fine wear debris.

The fine wear debris and other fine debris can enter the blade chamber through the elongated hole and become adhered to the film surface, image sensor surface, etc. Thus, the technology of Patent Document 1 has been proposed as technology to inhibit wear debris and the like from adhering to the surface of the image sensor.

A camera-use focal plane shutter described in Patent Document 1 is provided with arc-like elongated holes 1b and 1c in a base plate 1. At edges of the elongated holes 1b and 1c, walls 1f and 1g are formed so as to protrude from a surface on the opposite side to the blade chamber. Grooves 1h and 1i are formed to the outside of the walls 1f and 1g, and adhesive sheets 7 and 8 are adhered on the bottom surfaces of the grooves 1h and 1i. With such a construction, wear debris is prevented from entering the blade chamber through the elongated holes. Note that the symbols described above are those used in Patent Document 1.

PRIOR ART DOCUMENTS

[Patent Document]
[Patent Document 1] Japanese Unexamined Patent Application No. 2003-270700

SUMMARY OF THE INVENTION

Problem to be Solved by the Invention

In the camera-use focal plane shutter described in Patent Document 1, the walls 1f and 1g are formed so as to protrude on the surface on the opposite side to the blade chamber. Consequently, the driving members and the like must be formed so as not to collide with the walls 1f and 1g when operating, and it was difficult to miniaturize these parts.

The present invention was conceived to solve this problem, and has the object of providing a focal plane shutter for a camera including driving members for driving at least one light-shielding blade arranged inside a blade chamber and a driving member located outside the blade chamber for driving the light-shielding blade, the focal plane shutter for the camera being arranged so that wear debris does not enter the blade chamber through an elongated hole provided in a base plate and so as to be suitable for miniaturization of the surface of the base plate on an opposing side to the blade chamber.

Means to Solve the Problem

To achieve the above-described object, the focal plane shutter for a camera of the present invention includes: a base plate having an aperture for a subject light path and at least one arc-like elongated hole beside the aperture, and forming a blade chamber with another plate member; at least one light-shielding blade formed from a plurality of arms pivotally attached to the base plate and at least one blade pivotally supported by each arm; and a driving member having a driving pin and being rotatably mounted on the base plate outside the blade chamber with the driving pin coupled to a corresponding one of the arms through the elongated hole formed by piercing, wherein a wall portion is provided on the base plate along at least a portion of a periphery of the elongated hole inside the blade chamber.

Here, if the plurality of arms of the light-shielding blade disposed furthest toward the base plate of the one or more light-shielding blades includes a bent portion bent in a step-like manner so that its tip end side exists further towards the base plate side than its rotation center side, the entry of wear debris into the blade chamber can be suppressed in a more suitable manner.

Moreover, if a rail along an operation path of at least one of the plurality of arms of the light-shielding blade is provided on the blade chamber side surface of the base plate, so as to protrude from the base plate more than the wall portion at a location near the elongated hole at which the wall portion is provided, the arm can be caused to operate stably during a shutter setting operation.

Further, a camera of the present invention includes one of the camera-use focal plane shutters of the above-described constructions.

Effect of the Invention

According to the present invention, it is possible to obtain a focal plane shutter for a camera arranged so that wear debris does not enter a blade chamber through an elongated hole provided in a base plate, and suitable for miniaturization of a surface on an opposing side to the blade chamber.

EMBODIMENTS OF THE INVENTION

Figure 1:
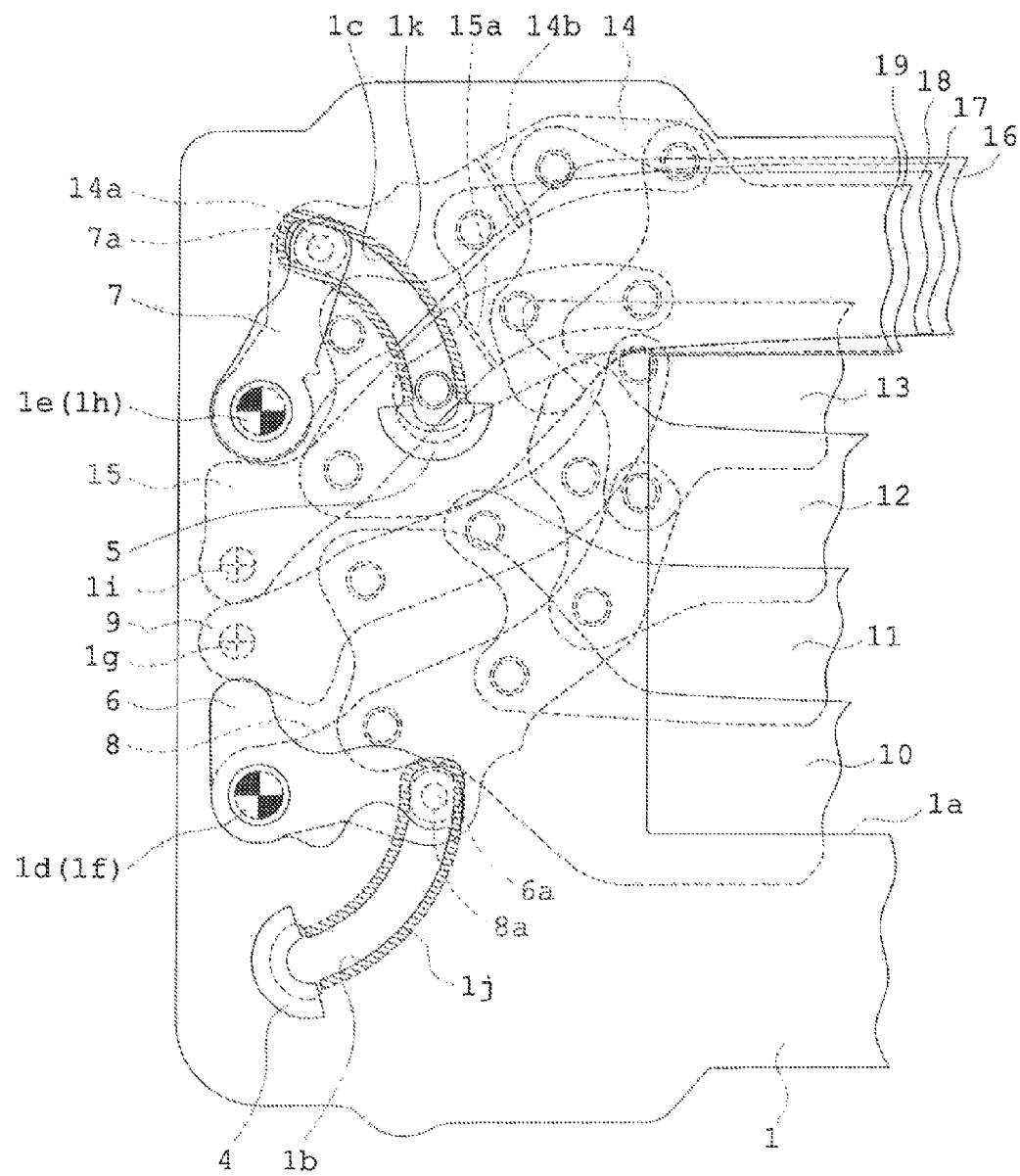
FIG. 1 is a plan view, as seen from a subject side, illustrating the left side half of embodiment 1 of the present invention with the device in a set state.
Figure 2:
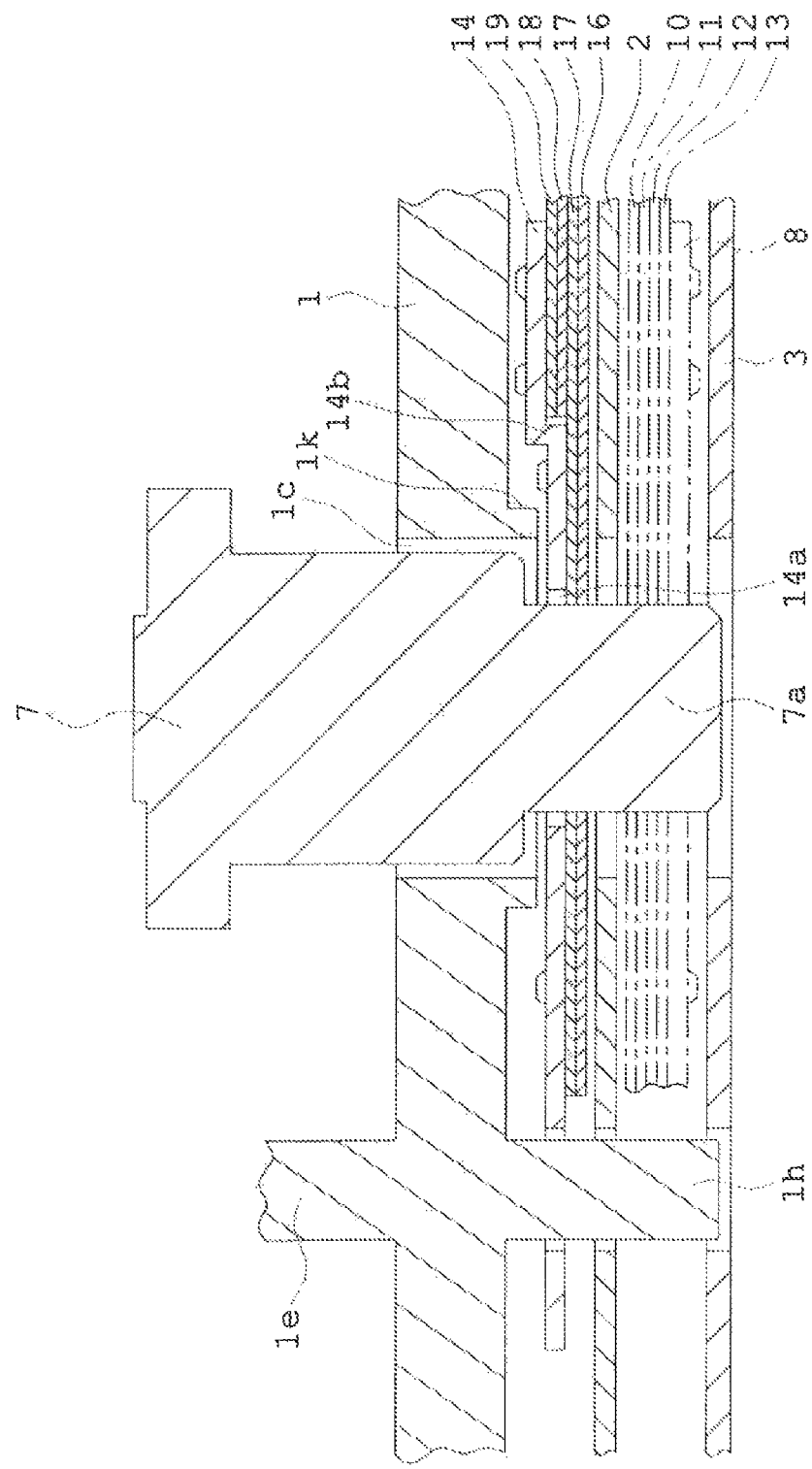
FIG. 2 is a key parts cross-sectional view schematically illustrating members disposed inside the blade chamber of front blades and rear blades of embodiment 1 of the present invention.
Figure 6:
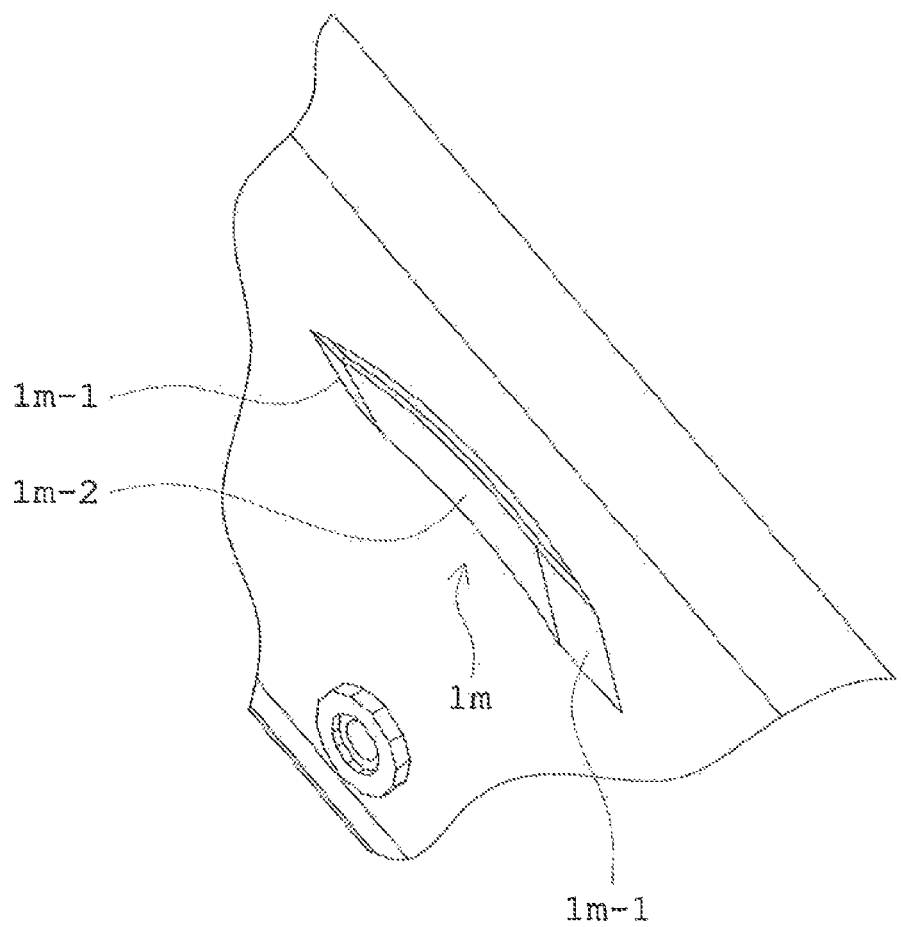
FIG. 6 is a perspective view schematically illustrating a rail of embodiment 2 of the present invention.
Figure 7:
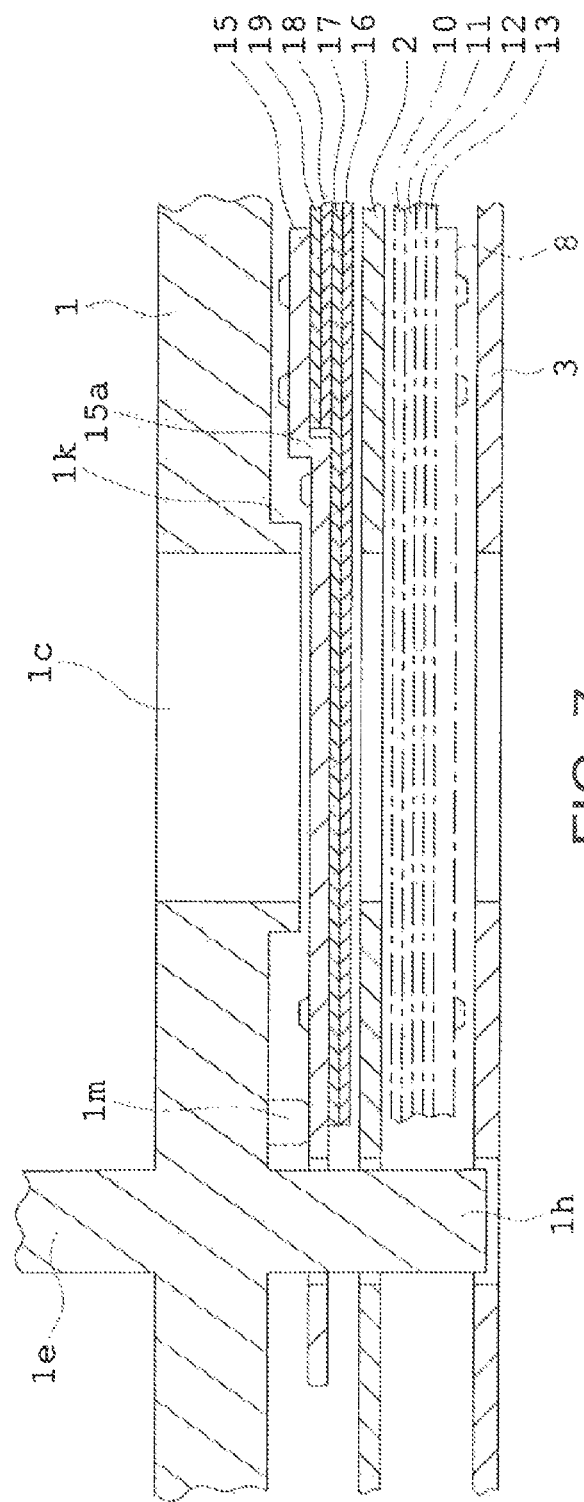
FIG. 7 is a key parts cross-sectional view schematically illustrating members disposed within the blade chamber of front blades and rear blades of embodiment 2 of the present invention.
Figure 8:
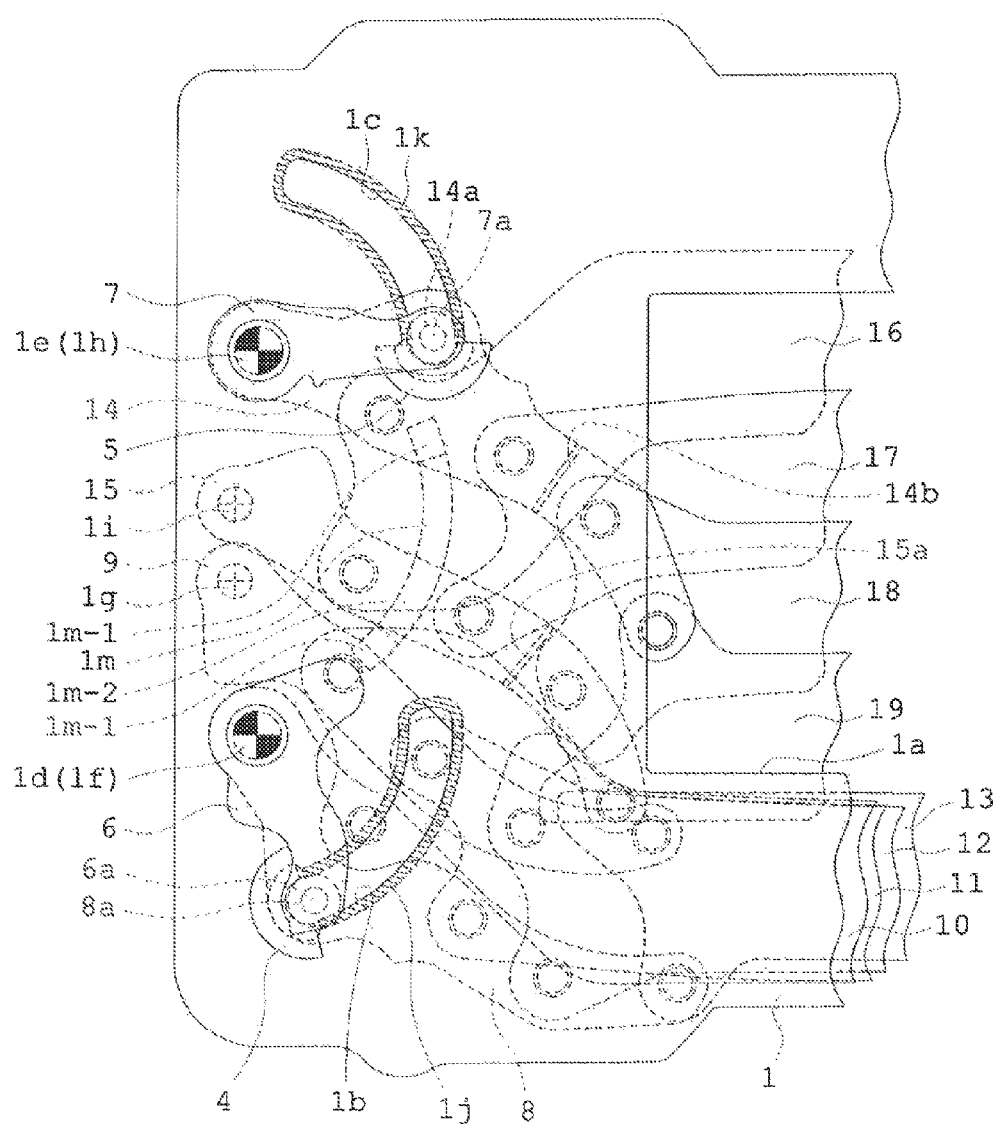
FIG. 8 is a plan view illustrating embodiment 2 of the present invention in a similar manner to FIG. 1, shown in the state immediately after completion of the exposure operation.

Embodiments for implementing the present invention are described in detail below with reference to the drawings. FIGS. 1 to 4 are drawings of embodiment 1 of the present invention and FIGS. 5 to 8 are drawings of embodiment 2 of the present invention. Note also that FIGS. 1, 3, 4, 5 and 6 are plan views illustrating the left side half and drive portion side of the focal plane shutter of the present invention when it is incorporated in a camera, as seen from a subject side. FIGS. 2 and 7 are views schematically illustrating the positional relationships of members disposed in the blade chamber of the focal plane shutter of the present invention. FIG. 8 is a perspective view schematically illustrating a rail of the focal plane shutter of embodiment 2 of the present invention. In the following description, the subject side of the base plate is described as being the front side and the image sensor side is described as being the back side.

Embodiment 1

Embodiment 1 is described with reference to FIGS. 1 to 4. First, the configuration of the present embodiment is described with reference to FIGS. 1 and 2. As illustrated in FIG. 1, a base plate 1 has formed therein a rectangular aperture 1*a*. Note that because, as mentioned above, FIG. 1 shows only the left side half of the driving portion with the shutter seen from the subject side, the same applies to the aperture 1*a*. As illustrated in FIG. 2, a predetermined gap is provided on the back side of the base plate 1, and an intermediate plate 2 and an auxiliary base plate 3 are attached in sequence by appropriate means, thereby a forming a rear blade chamber between the base plate 1 intermediate plate 2 and a front blade chamber between the intermediate plate 2 and the auxiliary base plate 3. Apertures similar to aperture 1*a*, but not shown in the drawing, are also formed the intermediate plate 2 and the auxiliary base plate 3. Note that intermediate plate 2 and auxiliary base plate 3 are not shown in any drawing other than FIG. 2. The image sensor is attached to a camera body, not shown the drawings, further towards the back side of the auxiliary base plate 3.

As illustrated in FIG. 1, two arc-like elongated holes 1*b* and 1*c* are formed as through holes to the left side of the aperture 1*a*. At the bottom ends of the elongated holes 1*b* and 1*c* are installed flat-form, C-shaped, butyl rubber shock absorbers 4 and 5 of a well-known design. Shafts 1*d* and 1*e* extend on the front side of the base plate 1, and shafts 1*f*, 1*g*, 1*h* and 1*i* extend on the back side. Of the shafts, shaft 1*d* and shaft 1*f*, and shaft 1*e* and shaft 1*h* are arranged to be concentric. Moreover, though these are not shown in the drawings by virtue of being of a well-known design, a plurality of shafts extend on the front side of the base plate 1 in a region on the left side of the aperture 1*a*. On the tips thereof, a supporting plate and printed circuit board are mounted so as to overlap with a supporting plate on the base plate 1 side and be parallel with the base plate 1. On the base plate 1 side of the support plate are installed a front blade-use electromagnet and a rear blade-use electromagnet of a well-known design, each of the electromagnets including an iron core. These electromagnets are also omitted from the drawings.

On the shaft 1*d* of the base plate 1, a front blade-use driving member 6 is rotatably installed. The front blade-use driving member 6 includes a driving pin 6*a* on the back side and is energized to rotate clockwise (in FIG. 1) by a front blade-use driving spring not shown in the drawings. The driving pin 6*a* passes through the elongated hole 1*b* and is inserted in the front blade chamber. The front blade-use driving member 6 is also attached to an iron member, not shown in the drawings, on the front side. In a set state, the iron core of the front blade-use electromagnet and the iron member are caused to be in contact.

On the shaft 1*e* of the base plate 1, a rear blade-use driving member 7 is rotatably installed. The rear blade-use driving member 7 includes a driving pin 7*a* on the back side and is energized to rotate clockwise (in FIG. 1) by a rear blade-use driving spring not shown in the drawings. The driving pin 7*a* passes through the elongated hole 1*c* and is inserted in the rear blade chamber. The rear blade-use driving member 7 is also attached to an iron member, not shown in the drawings, on the front side. In a set state, the iron core of the rear blade-use electromagnet and the iron member are caused to be in contact.

In addition, on the front side of the base plate 1, setting members not shown in the drawings are installed. During setting operations, the setting members cause the front blade driving member and the rear blade driving member to rotate. However, as this configuration is well-known, it is not described here.

Next, the configuration on the back side of the base plate 1 will be described with reference to FIGS. 1 and 2. As illustrated in FIG. 1, on the back side of the base plate 1, wall portions 1*j* and 1*k* are formed protruding towards the back side from edges of the elongated holes 1*b* and 1*c* respectively. The wall portions 1*j* and 1*k* are formed along edges of the elongated holes 1*b* and 1*c*, around the entire periphery of the elongated holes 1*b* and 1*c* except at the bottom end portions where the shock absorbers 4 and 5 are installed. The wall portions 1*j* and 1*k* would not normally be visible in FIG. 1 but are shown with cross hatching here for easy understanding, Front blade-use arms 8 and 9 are rotatably installed on the shafts 1*f* and 1*g* extending on the back side of the base plate 1. Blade members 10, 11, 12 and 13 are attached by rivet members of a well-known design to the front blade-use arms 8 and 9. Of these, the blade member 13 attached furthest towards the tip end of the front blade-use arms 8 and 9 is a slit forming blade of the front blade. The front blade is disposed in the front blade chamber formed in the manner described above between the intermediate plate 2 and the auxiliary base plate 3. A hole 8*a* is formed in the front blade-use arm 8, and the driving pin 6*a* of the front blade-use driving member 6 is inserted into the hole 8*a*. Note that the front blade-use arms 8 and 9 differ from later-described rear blade-use arms 14 and 15 in having a flat form without bent portions being formed.

Rear blade-use arms 14 and 15 are rotatably installed on the shafts 1*h* and 1*i* extending on the back side of the base plate 1.

Blade members 16, 17, 18 and 19 are attached by rivet members of a well-known design to the rear blade-use arms 14 and 15. Of these, the blade member 19 attached furthest towards the tip end of the rear blade-use arms 14 and 15 is the slit forming blade of the rear blade. The rear blade is disposed in the rear blade chamber formed in the manner described above between the base plate 1 and the intermediate plate 2. A hole 14a and bent portion 14b are formed in the rear blade-use arm 14, and the driving pin 7a of the rear blade-use driving member 7 is inserted into the hole 14a. A bent portion 15a is also formed in the rear blade-use arm 15 in the same way as for rear blade-use arm 14.

Next, the positional relationship between the wall portions 1j and 1k protruding from the back side of the base plate 1 and the front and rear blades will be described with reference to FIG. 2. FIG. 2 is a key parts cross-sectional view schematically illustrating members disposed in the front and rear blade chambers, and is not a breakaway view of specific locations in the plan views of FIGS. 1, 3 and 4. The front blade is disposed in the blade chamber formed in the manner described above between the intermediate plate 2 and the auxiliary base plate 3, and the rear blade is disposed in the blade chamber formed between the base plate 1 and the intermediate plate 2. The front blade in FIG. 2 would not normally be seen but is indicated here by the dot-dash line for comparison with the form of the rear blade. As illustrated in FIG. 2, the wall portion 1k of the base plate 1 is formed so as to protrude within the rear blade chamber. However, the protruding height of the wall portion 1k and the total height of the step formed by the bent portion 14b and the head portion of the rivet member are approximately the same. Although not shown in FIG. 2, the bent portion 15a of the rear blade-use arm 15 is formed, like the bent portion 14b of the rear blade-use arm 14, so that the protruding height of the wall portion 1k and the total height of the step and the head portion of the rivet member are approximately the same. Hence, a narrow gap will always be maintained between the rear blade-use arms 14 and 15 and the wall portion 1k during operation of the rear blade. As described above, the front blade-use arm 8 has a flat form with no bent portion formed therein.

Figure 3:
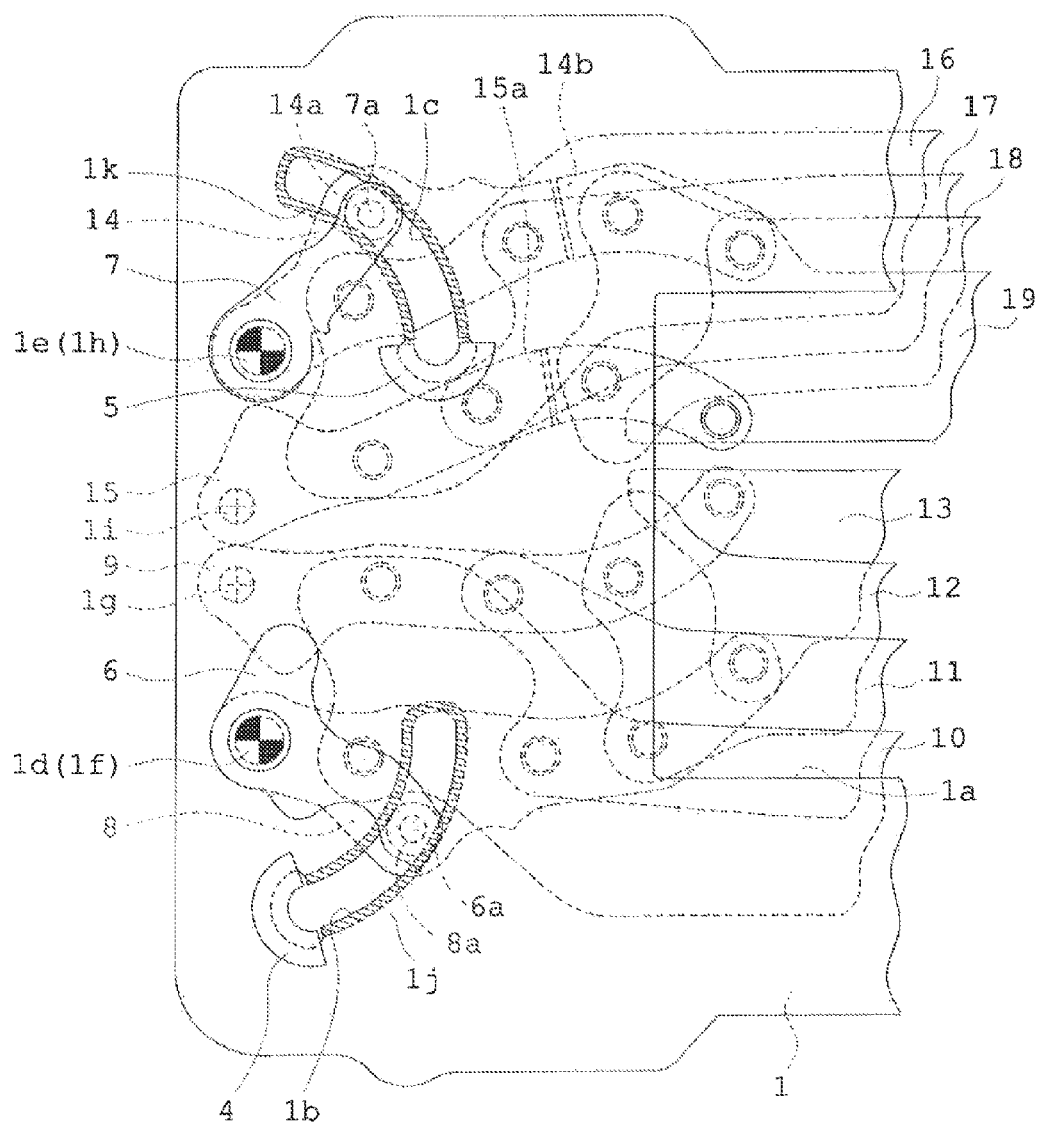
FIG. 3 is a plan view illustrating embodiment 1 of the present invention in a similar manner to FIG. 1, shown midway through an exposure operation.
Figure 4:
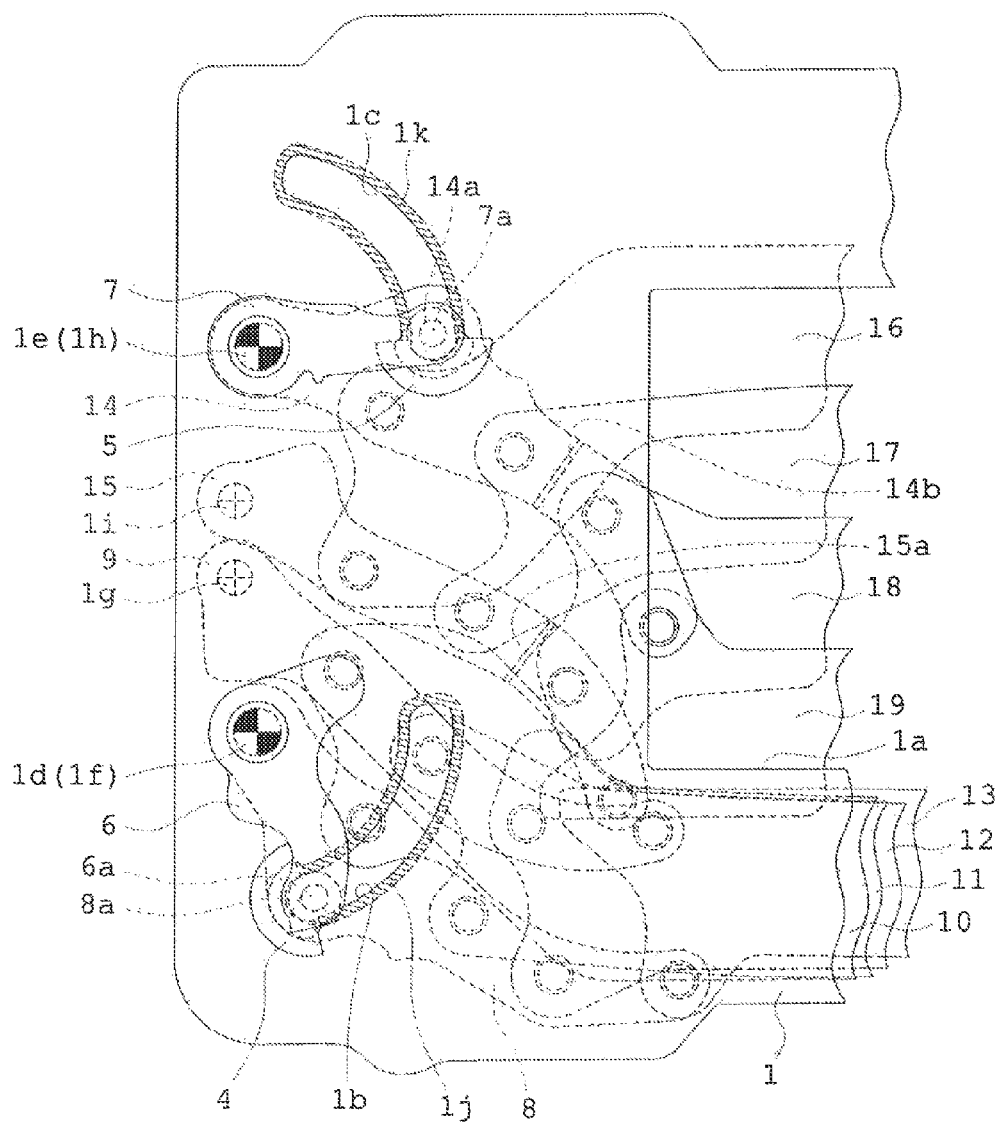
FIG. 4 is a plan view illustrating embodiment 1 of the present invention in a similar manner to FIG. 1, shown in a state immediately after completion of the exposure operation.

Next, the operation of the present embodiment is described with reference to FIGS. 1, 3 and 4. FIG. 1 illustrates a state immediately before starting the exposure operation. Specifically, when the release button of the camera is pressed, the front blade-use electromagnet and rear blade-use electromagnet are turned on, causing the iron cores of the electromagnets to attract and hold the iron members of the driving members 6 and 7. At this point, the setting members not shown in the drawings have been returned to their initial position. At this time, the 4 blade members 10, 11, 12 and 13 of the front blade are in a deployed state with minimal overlap between adjacent blades, shutting off the aperture 1a. The 4 blade members 16, 17, 18 and 19 of the rear blade are in a superimposed state with maximal overlap between adjacent blades, and stored in a region above the aperture 1a.

After the state illustrated in FIG. 1 is reached, the power to the front blade-use electromagnet is initially turned off. Then, after a predetermined period, the power to the rear blade-use electromagnet is also turned off. First, when the power to the front blade-use electromagnet is turned off, the attraction force on the iron member of the front blade-use driving member 6 is lost, and the front blade-use driving member 6 is caused to rotate rapidly clockwise, under the biasing force of the front blade-use driving spring not shown in the drawings. Thus, since the front blade-use arm 8 is rotated clockwise by the driving pin 6a, the 4 blade members 10, 11, 12 and 13 of the front blade move downwards, increasing the overlap between adjacent blades so that the top edge of the slit forming blade 13 opens the aperture 1a.

Next, when the power to the rear blade-use electromagnet is turned off and the attraction force on the iron member of the rear blade-use driving member 7 is lost, rear blade-use driving member 7 is caused to rotate rapidly clockwise under the biasing force of the rear blade-use driving spring not shown in the drawings. Thus, since the rear blade-use arm 14 is rotated clockwise by the driving pin 7a, the 4 blade members 16, 17, 18 and 19 of the rear blade move downwards, gradually reducing the overlap between adjacent blades so that the bottom edge of the slit forming blade 19 closes the aperture 1a. Subsequently, as a result of the slit being formed between the two slit forming blades 13 and 19, exposure is performed on the image sensor. A state midway through this exposure operation is illustrated in FIG. 3.

Then, when the final stage of the exposure operation is reached, the front blade-use driving member 6 causes the driving pin 6a to make contact with the shock absorber 4 and stop. As a result, the 4 blade members 10, 11, 12 and 13 of the front blade are stored in the superimposed state in a region below the aperture 1a. Meanwhile, the rear blade-use driving member 7 causes the driving pin 7a to make contact with the shock absorber 5 and stop. As a result, the 4 blade members 16, 17, 18 and 19 of the rear blade are in a state of rest with the aperture 1a fully closed. The state after completion of the exposure operation is illustrated in FIG. 4.

When the exposure operation has been completed in the manner described, a setting operation is performed by the setting members not shown in the drawings. When the setting members not shown in the drawings are caused to rotate, the setting member first pushes the front blade-use driving member 6 causing the front blade-use driving member 6 to rotate anticlockwise against the biasing force of the front blade-use driving spring. Hence, the front blade-use arm 8 is caused to rotate anticlockwise by the driving pin 6a, and the 4 blade members 10, 11, 12 and 13 of the front blade move upwards while reducing the overlap between them.

When the slit forming blade 13 of the front blade overlaps the slit forming blade 19 of the rear blade by a predetermined amount, the setting member then pushes the rear blade-use driving member 7 causing the rear blade-use driving member 7 to rotate anticlockwise against the biasing force of the rear blade-use driving spring. Hence, the rear blade-use arm 14 is caused to rotate anticlockwise by the driving pin 7a, and the 4 blade members 16, 17, 18 and 19 of the rear blade move upwards while increasing the overlap between them.

Then, although the front blade-use driving member 6 and the rear blade-use driving member 7 are each caused to rotate anticlockwise against the biasing forces of the driving springs, the rotation of the setting members causes the 4 blade members 16, 17, 18 and 19 of the rear blade to overlap and withdraw to a position above the aperture 1a. At the same time, the 4 blade members 10, 11, 12 and 13 are deployed so as to fully cover the aperture 1a. This operation is stopped at the point that the iron members of the driving members 6 and 7 are in secure contact with the iron cores of the front blade-use electromagnet and the rear blade-use electromagnet. In this way, the setting operation is completed, and conditions return to the state illustrated in FIG. 1.

In the present embodiment, the wall portions 1j and 1k are formed to protrude on the back side of the base plate 1, and since they do not protrude on the front side of the base plate 1, there is no need to be concerned about interference with members installed on the front side of the base plate 1. Hence, the degree of freedom in determining the layout is not restricted and it is possible to miniaturize the device, and further to suppress the entry of wear debris into the blade chamber to a greater extent. The rear blade-use arms 14 and 15 disposed in the rear blade chamber formed between the base plate 1 and the intermediate plate 2 have formed therein the step-like bent portions 14b and 15a so that the tip end side of the arms is positioned further towards the base plate 1 than the rotation center side. Hence, as described above, during operation, the rear blade-use arms 14 and 15 can operate while keeping a small distance away from the wall portion 1k. Hence, even if wear debris enters the aperture 1c, the rear blade-use arms 14 and 15 block the wear debris, suitably and substantially suppressing entry of wear debris into the blade chamber.

Embodiment 2

Next, the configuration of embodiment 2 is described using FIGS. 5 to 8. First, the configuration of the present embodiment will be described with references to FIGS. 5 to 7. In the present embodiment, a rail is provided on the base plate 1 described in embodiment 1 so that the rear blade-use arm 15 operates in stable manner. Hence, the present embodiment will be described simply, and descriptions of areas already described in embodiment 1 will be omitted.

Figure 5:
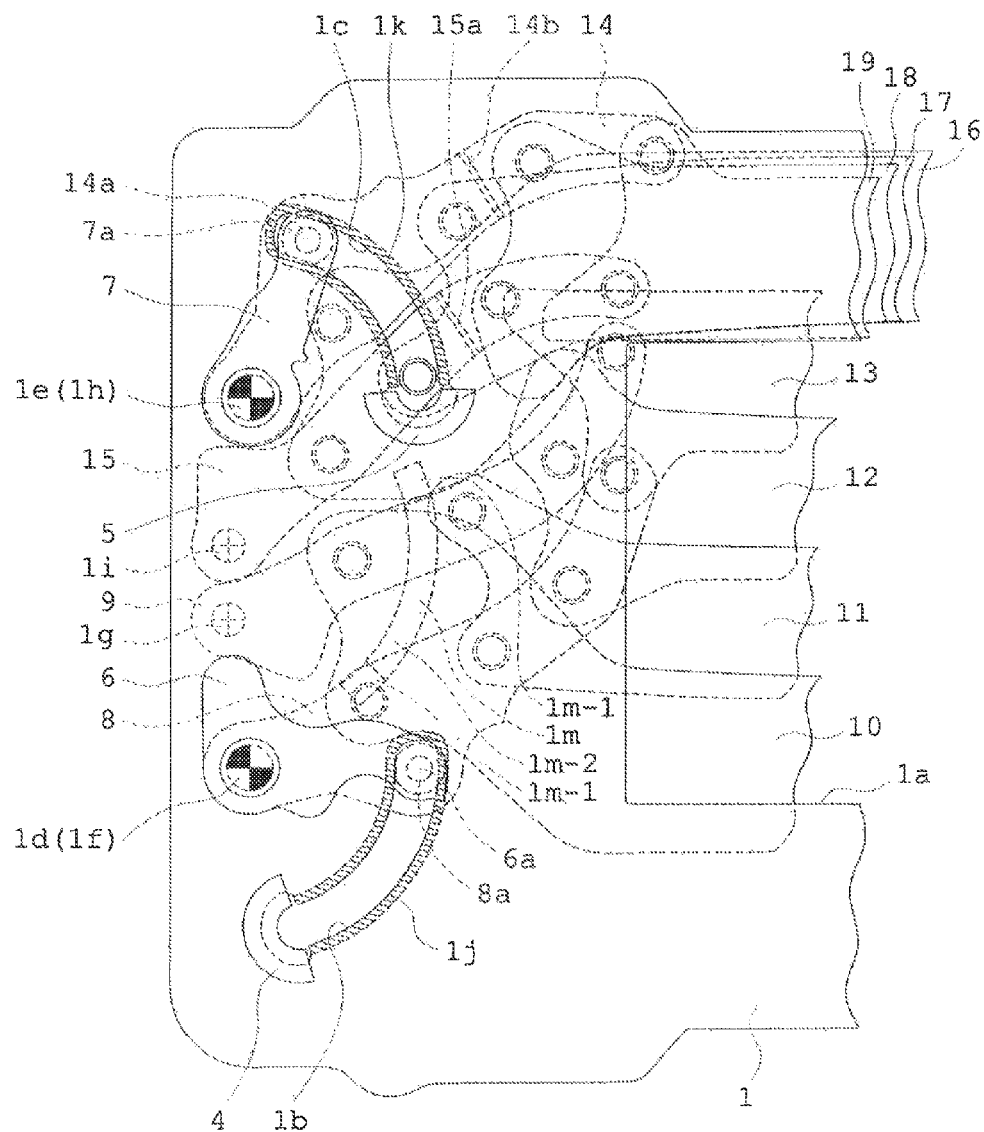
FIG. 5 is a plan view illustrating embodiment 2 of the present invention in a similar manner to FIG. 1, shown in the set state.

As illustrated in FIG. 5, the base plate 1 has a rail 1m formed on a back side thereof, between the elongated hole 1b and the elongated hole 1c. The rail 1m is formed to follow an operation path of the rear blade-use arm 15. As illustrated in FIG. 6, the rail 1m has end portions 1m-1 formed in a tapered shape and a central portion 1m-2 formed to be flat. The central portion 1m-2 of the rail 1m is formed to be higher than the wall portion 1k formed at the edge of the elongated hole 1c. In other words, the central portion 1m-2 of the rail 1m is formed to protrude further towards the back side of the base plate 1 than the wall portion 1k. The positional relationship between the rail 1m and the wall portion 1k is illustrated in FIG. 7. FIG. 7 is a key parts cross-sectional view schematically illustrating the positional relationships of various members, and is not a breakaway view of specific locations in the plan views of FIGS. 5 and 8.

Next, the operation of the present embodiment is described with reference to FIGS. 5 and 8. FIG. 5 illustrates a state immediately before starting the exposure operation. At this time, the 4 blade members 10, 11, 12 and 13 of the front blade are in a deployed state with minimal overlap between adjacent blades, shutting off the aperture 1a. The 4 blade members 16, 17, 18 and 19 of the rear blade are in a superimposed state with maximal overlap between adjacent blades, and stored in a region above the aperture 1a.

When the exposure operation starts, the power to the front blade-use electromagnet is turned off and the front blade-use driving member 6 is caused to rotate rapidly clockwise, under the biasing force of the front blade-use driving spring not shown in the drawings. Thus, since the front blade-use arm 8 is rotated clockwise by the driving pin 6a, the 4 blade members 10, 11, 12 and 13 of the front blade move downwards, increasing the overlap between adjacent blades so that the top edge of the slit forming blade 13 opens the aperture 1a. After a predetermined period has elapsed, the power to the rear blade-use electromagnet is turned off and the rear blade-use driving member 7 is caused to rotate rapidly clockwise under the biasing force of the rear blade-use driving spring not shown in the drawings. Hence, since the rear blade-use arm 14 is rotated clockwise by the driving pin 7a, the 4 blade members 16, 17, 18 and 19 of the rear blade move downwards while reducing the overlap between adjacent blades, and the bottom edge of the slit forming blade 19 closes the aperture 1a.

Here, the rear blade-use arm 15 is in contact with the rail 1m from midway during the exposure operation. At that time, since the rail 1m includes tapered end portions 1m-1, the rear blade-use arm 15 comes into contact with the central portion 1m-2 while being guided by the end portions 1m-1. As a result, the rear blade-use arm 15 can continue to operate in a stable manner when contacting the rail 1m during the exposure operation.

Then, when the final stage of the exposure operation is reached, the front blade-use driving member 6 causes the driving pin 6a to make contact with the shock absorber 4 and stop, and the rear blade-use driving member 7 causes the driving pin 7a to make contact with the shock absorber 5 and stop. The state after completion of the exposure operation in this manner is illustrated in FIG. 8. At this time, the rear blade-use arm 15 is in a state of contact with the central portion 1m-2 of the rail 1m.

When the exposure operation has been completed, a setting operation is performed by setting members not shown in the drawings. When the setting members not shown in the drawings are caused to rotate, the setting member first pushes the front blade-use driving member 6 causing the front blade-use driving member 6 to rotate anticlockwise against the biasing force of the front blade-use driving spring. Hence, the front blade-use arm 8 is caused to rotate anticlockwise by the driving pin 6a, and the 4 blade members 10, 11, 12 and 13 of the front blade move upwards while reducing the overlap between them.

In this manner, when the slit forming blade 13 of the front blade overlaps the slit forming blade 19 of the rear blade by a predetermined amount, from that stage, the setting member pushes the rear blade-use driving member 7 causing the rear blade-use driving member 7 to rotate anticlockwise against the biasing force of the rear blade-use driving spring. Hence, the rear blade-use arm 14 is caused to rotate anticlockwise by the driving pin 7a, and the 4 blade members 16, 17, 18 and 19 of the rear blade move upwards while increasing the overlap between them.

Here, the rear blade-use arm 15 separates from the central portion 1m-2 of the rail 1m from midway during the setting operation. Before the rear blade-use arm 15 fully separates from the central portion 1m-2 of the rail 1m, the rear blade-use arm 15 begins covering the elongated hole 1c. As described above, since the central portion 1m-2 of the rail 1m is formed to be higher than the wall portion 1k provided at the edge of the elongated hole 1c, the rear blade-use arm 15, a portion of which is in contact with the central portion 1m-2 of the rail 1m, can never contact the location where the step is formed at the bottom of the wall portion 1k formed at the edge of the elongated hole 1c, as illustrated in FIGS. 5 and 8. As a result, the rear blade-use arm 15 can continue to operate in a stable manner during the setting operation.

Then, the 4 blade members 16, 17, 18 and 19 of the rear blade are caused to overlap and stored in the position above the aperture 1a. At the same time, the 4 blade members 10, 11, 12 and 13 of the front blade are deployed so as to fully cover the aperture 1a. The rotation of the setting members is stopped at the point that the iron members of the driving members 6 and 7 are in secure contact with the iron cores of the front blade-use electromagnet and the rear blade-use electromagnet. In this way, the setting operation is completed, and conditions return to the state illustrated in FIG. 5.

In the present embodiment, like in embodiment 1, the wall portions 1j and 1k are formed to protrude towards the back side of the base plate 1, so the degree of freedom in determining the layout is not restricted and it is possible miniaturize the focal plane shutter. In addition, the entry of wear debris into the blade chamber can be greatly suppressed. Also, with the present embodiment, since the rail 1m is formed to be higher than the wall portion 1k, the rear blade-use arm 15 will never collide with the wall portion 1k during the setting operation, so operating stability can be maintained.

In the above-described embodiments, a configuration was described in which the focal plane shutter is installed in the camera with the base plate including driving members and the like attached on the subject side, and the auxiliary base plate on the photographer side. However, in the present invention, it is also acceptable for the base plate to be installed on the photographer side.

Further, in the above-described embodiments, the focal plane shutter included two light-shielding blades, the front blade and the rear blade. However, in the present invention, a focal plane shutter having a single light-shielding blade may be used. In such case, when the front blade and the linking members for opening and closing operations of the front blade in the above-described embodiments are removed, the entry of wear debris into the blade chamber can be favorably suppressed by the rear blade-use arms 14 and 15 including the bent portion. On the other hand, it is possible to remove the rear blade and the relevant members for opening and closing operations of the rear blade in the above-described embodiments, and to provide only front blade including the flat-form front blade-use arms 8 and 9 which do not have a bent portion.

In the above-described embodiments, the front blade including the flat-form front blade-use arms 8 and 9 is disposed in the blade chamber formed between the intermediate plate 2 and the auxiliary base plate 3, and the rear blade including the rear blade-use arms 14 and 15 having the bent portion is disposed in the blade chamber formed between the base plate 1 and the intermediate plate 2. However, an arrangement may be used in which a rear blade including flat-form arms is disposed in the blade chamber formed between the intermediate plate 2 and the auxiliary base plate 3, and the front blade including arms having the bent portion facing the base plate 1 is disposed in the blade chamber formed between the base plate 1 and the intermediate plate 2.

Also, the above-described embodiments describe a configuration suitable for a direct-type focal plane shutter in which the two driving members that operate the front blade and the rear blade each include an iron member and, in the setting operation, the setting members rotate the driving members until the iron members contact the two electromagnets, which are not generating a magnetic field. However, the present invention is not limited to this configuration. The configuration may be one suitable for a locking type focal plane shutter in which the driving members are locked in the set position by locking members.

The present invention may also be applied in the cases that the driving means for moving the driving members to the set position are members on the camera body side, or an electromagnetic driving source provided in the focal plane shutter,

DESCRIPTION OF THE SYMBOLS

1 Base plate
1a Aperture
1b, 1c Elongated hole
1j, 1k Wall portion
1m Rail
2 Intermediate plate
3 Auxiliary base plate
4, 5 Shock absorber
3 Front blade-use driving member
6a, 7a Driving pin
7 Rear blade-use driving member
8, 9 Front blade-use arm
10, 11, 12, 13 Blade member
14, 15 Rear blade-use arm
14a, 15a Bent portion
10, 11, 12, 13 Blade member

The invention claimed is:

1. A focal plane shutter for a camera, the focal plane shutter comprising:
   a base plate having a subject light path-use aperture and at least one arc-like elongated hole beside the aperture, and forming a blade chamber with another plate member;
   at least one light-shielding blade formed from a plurality of arms pivotally attached to the base plate and at least one blade pivotally supported by each arm; and
   a driving member having a driving pin and being rotatably mounted on the base plate outside the blade chamber with the driving pin coupled to a corresponding one of the arms pierced through the elongated hole,
   wherein a wall portion is provided on the base plate along at least a portion of a periphery of the elongated hole inside the blade chamber.

2. The focal plane shutter for the camera according to claim 1, wherein the plurality of arms of the light-shielding blade disposed furthest toward the base plate of the one or more light-shielding blades includes a bent portion bent in a step-like manner so that its tip end side exists further towards the base plate side than a rotation center side.

3. The focal plane shutter for the camera according to claim 1, wherein a rail along an operation path of at least one of the plurality of arms of the light-shielding blade is provided on a surface of the blade chamber side of the base plate, so as to protrude from the base plate more than the wall portion at a location near the elongated hole at which the wall portion is provided.

4. A camera including a focal plane shutter, the focal plane shutter comprising:
   a base plate having a subject light path-use aperture and at least one arc-like elongated hole beside the aperture, and forming a blade chamber with another plate member;
   at least one light-shielding blade formed from a plurality of arms pivotally attached to the base plate and at least one blade pivotally supported by each arm; and
   a driving member having a driving pin and being rotatably mounted on the base plate outside the blade chamber with the driving pin coupled to a corresponding one of the arms pierced through the elongated hole,
   wherein a wall portion is provided on the base plate along at least a portion of a periphery of the elongated hole inside the blade chamber.

5. The camera according to claim 4, wherein the plurality of arms of the light-shielding blade disposed furthest toward the base plate of the one or more light-shielding blades includes a bent portion bent in a step-like manner so that its tip end side exists further towards the base plate side than a rotation center side.

6. The camera according to claim 4, wherein a rail along an operation path of at least one of the plurality of arms of the light-shielding blade is provided on a surface of the blade chamber side of the base plate, so as to protrude from the base plate more than the wall portion at a location near the elongated hole at which the wall portion is provided.

7. The camera according to claim 5, wherein a rail along an operation path of at least one of the plurality of arms of the light-shielding blade is provided on a surface of the blade chamber side of the base plate, so as to protrude from the base plate more than the wall portion at a location near the elongated hole at which the wall portion is provided.

8. The focal plane shutter for the camera according to claim 2, wherein a rail along an operation path of at least one of the plurality of arms of the light-shielding blade is provided on a surface of the blade chamber side of the base plate, so as to protrude from the base plate more than the wall portion at a location near the elongated hole at which the wall portion is provided.

\* \* \* \* \*